United States Patent [19]

Williams

[11] Patent Number: 4,838,503
[45] Date of Patent: Jun. 13, 1989

[54] MECHANISM FOR SUPPORTING AND EXTENDING A HIGH LIFT DEVICE FOR AIRCRAFT WINGS

[75] Inventor: George H. Williams, Bristol, United Kingdom

[73] Assignee: British Aerospace PLC, London, United Kingdom

[21] Appl. No.: 193,786

[22] Filed: May 13, 1988

[30] Foreign Application Priority Data

May 13, 1987 [GB] United Kingdom ............... 8711252

[51] Int. Cl.⁴ ............................................. B64C 3/50
[52] U.S. Cl. ....................................... 244/214; 244/213
[58] Field of Search ............... 244/213, 214, 215, 216, 244/217

[56] References Cited

U.S. PATENT DOCUMENTS

| 1,917,428 | 7/1933 | Burnelli | 244/214 |
| 4,471,928 | 9/1984 | Cole | 244/215 |

FOREIGN PATENT DOCUMENTS

| 0045988 | 2/1982 | European Pat. Off. | |
| 3643157 | 7/1987 | Fed. Rep. of Germany | 244/214 |

Primary Examiner—Sherman D. Basinger
Assistant Examiner—Rodney Corl
Attorney, Agent, or Firm—Kerkam, Stowell, Kondracki & Clarke

[57] ABSTRACT

A mechanism for supporting and extending a high lift device relative to an aerofoil, comprises one or more support beams (10) connected to the aerofoil, a pair of spaced apart chordwise extending wing ribs (20) bounding the support beam, a set of cylindrical rollers (23) mounted between the wing ribs for supporting the support beam (10) with their rotational axes aligned transversely with respect to the support beam (10), the support beam (10) including a gear rack (12) with gear teeth facing downwardly and a pinion gear (13) lying in meshing engagement with the gear rack (12), and an actuator (14) in driving engagement with the pinion gear (13) to extend and retract the high lift device (2-6) relative to the aerofoil (1). Bearings (45, 47) are provided for rotatably supporting the pinion gear (13) between the wing ribs (20) about a generally transverse axis of rotation, and there are splined engaging means (42, 43) between the actuator (14) and the pinion gear (13).

5 Claims, 3 Drawing Sheets

FIG.4
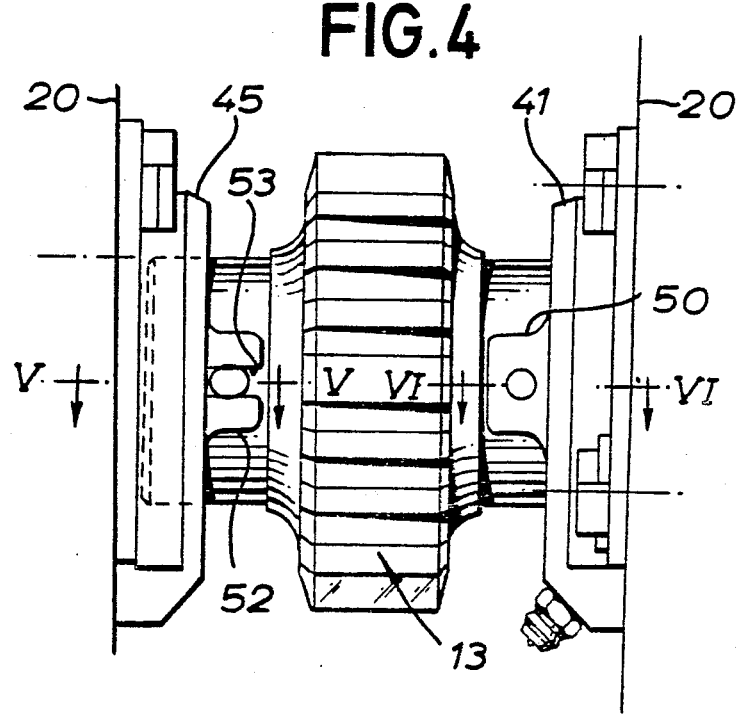
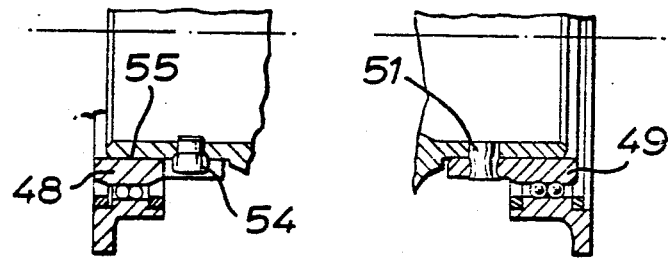
FIG.5 FIG.6

MECHANISM FOR SUPPORTING AND EXTENDING A HIGH LIFT DEVICE FOR AIRCRAFT WINGS

This invention relates to a mechanism for supporting and extending a high lift device for aircraft wings; more particularly it is concerned with such a mechanism for use with high lift devices such as leading edge slats or trailing edge flaps which are supported off the main wing structure by substantially chordwise support beams or carrier track and by which means the said slats or flaps are movable from a stowed cruise configuration to an extended high-lift configuration.

In one known arrangement, such as that disclosed in U.S. Pat. No. 4,471,928 and its partial equivalent EP-A-0,045,988, the carrier track includes a toothed section, guide means secured to the said main wing structure and being in guiding contact with the said track for support thereof, and a pinion gear adapted to be in meshing engagement with the said toothed section for extending and retracting the high lift device. Also in that arrangement, the toothed section, i.e. a single piece gear rack, is a separate component from the carrier track which is of inverted U-shaped cross-section forming a channel into which the gear rack is mounted with its gear teeth facing downwardly, the gear rack being located to the carrier track by a series of horizontally disposed bolted attachments. The drive gear, that is, the gear rack in meshing engagement with the pinion gear and the support track, are centred spanwise between a pair of wing ribs, one of which supports a horizontally disposed actuator having a splined output shaft engaging the pinion gear. The actuator and thus the pinion gear lie coincidentally with an axially aligned series of high speed shafts which function to synchronise the extension or retraction sequence of a spanwise series of slat portions, for example.

To achieve an accurate and controlled meshing relationship between the single-piece gear rack and the pinion, it would be preferable that, on the one hand, means were provided to ensure that the rack is correctly jigged and located to the carrier track prior to its assembly to the wing and, on the other, to provide an assembly in which the pinion gear is rotatably mounted to the wing structure independently of the actuator so that the track is installed into engagement with the pinion and maintained as such even when the actuator and/or the high speed shaft system is dismantled for whatever purpose.

In prior art arrangements, as exemplified by U.S. Pat. No. 4,471,928, the pinion gear is only installed simultaneously with the actuator engaging splines on the actuator shaft. Thus, when the actuator is withdrawn for any purpose, the pinion is automatically disconnected from its engagement with the gear rack. Due to the tight interface between the pinion and the actuator necessary in this method of assembly the installation of the pinion or its removal may be difficult, particularly for reasons of access or manoeuvrability in the very limited space available within the wing structure. Furthermore the pinion may be subject to damage, contamination or misplacement. In the case of the track the use of 'drilled to size' holes in the track and gear rack is impracticable for numerous reasons, not least of which is the difficulty of achieving accurate positioning of the gear rack to achieve the correct tooth pitch datum, and more particularly the pitch circle radius in the case of an arcuate carrier track arrangement.

It is the object of the present invention to overcome these shortcomings, and to enable achievement of the desiderata set out above.

According to one aspect of the present invention there is provided a mechanism for supporting and extending a high lift device relative to an aerofoil, comprising one or more carrier beams adapted to be connected to said aerofoil, a pair of spaced apart chordwise extending wing ribs bounding the or each said carrier beam, supporting means mounted between said wing ribs for supporting said carrier beam(s) the or each said carrier beam carrying a gear rack with gear teeth facing downwardly and a pinion gear in meshing engagement with said gear rack and an actuator in driving engagement with said pinion gear to extend and retract the high lift device relative to said aerofoil characterised in that means are provided for rotatably supporting said pinion gear between said wing ribs about a generally transverse axis of rotation independently of said actuator. The means for rotatably supporting the pinion gear includes self-aligning bearings with inner bearing sleeves mounted fast in rotation with the pinion gear.

One embodiment of the invention will now be described, by way of example only, with reference to the following drawings, in which:

FIG. 4 illustrates a view on the pinion-bearing assembly in direction of arrow IV in FIG. 2;

FIG. 5 is a localised cross-section on the pinion bearing assembly taken along the plane indicated by a line V—V in FIG. 4, and FIG. 6 is a further localised cross-section on the pinion bearing assembly taken along the plane indicated by a line VI—VI in FIG. 4.

Figure 1:
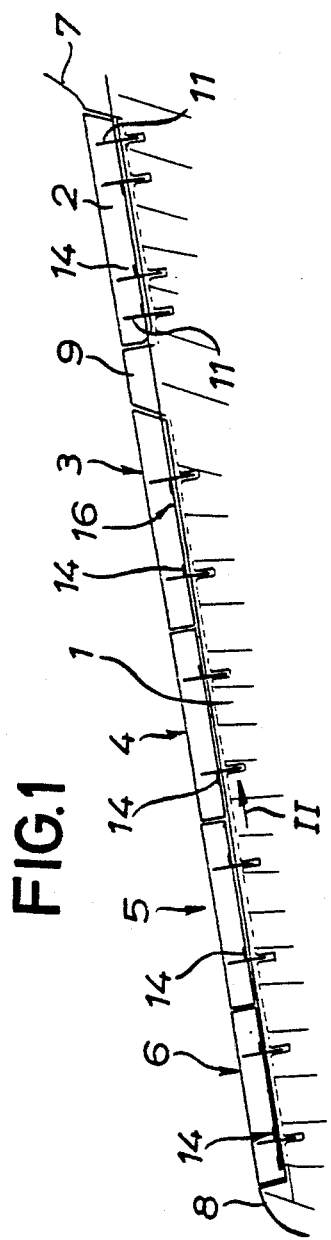
FIG. 1 is a diagrammatic plan view on a port wing leading edge slat arrangement.

Referring to the drawings, FIG. 1 illustrates diagrammatically a port wing leading edge arrangement 1 in which a series of movable leading edge slat portions 2, 3, 4, 5 and 6 extend spanwise between the wing root 7 and the wing tip 8. The slat portions 3–6 inclusive lie closely adjacent to eath other whereas the inboard en of the slat portion 3 and the outboard end of the slat portion 2 terminate adjacent a wing leading edge portion 9 aligning with the engine mounting structure, not illustrated here for reasons of clarity. Each of the slat portions 3–6 inclusive is supported off the main wing structure on two arcuate support beams 10 (also referred to as 'track 10') whilst the inner slat portion 2 is supported on two inner arcuate support beams 10 and two outer arcuate support beams 11.

As will be described and illustrated in more detail later, each arcuate support beam 10 includes an arcuate gear rack 12 engaging a pinion gear 13 rotatably supported upon the fixed wing leading edge structure and connected in driven engagement with a rotary actuator 14. Each pinion gear 13 and its respective actuator 14 is concentrically located about a common longitudinal axis of rotation 15 and interconnected by longitudinal torque shaft portions 16 which extend outwardly to terminate in a brake and asymmetry detection unit 17 and inwardly to an interconnection (not shown) with the corresponding starboard wing installation. This ensures matched actuation and deployment of each slat portion and simultaneously, the port and starboard slat systems.

Figure 2:
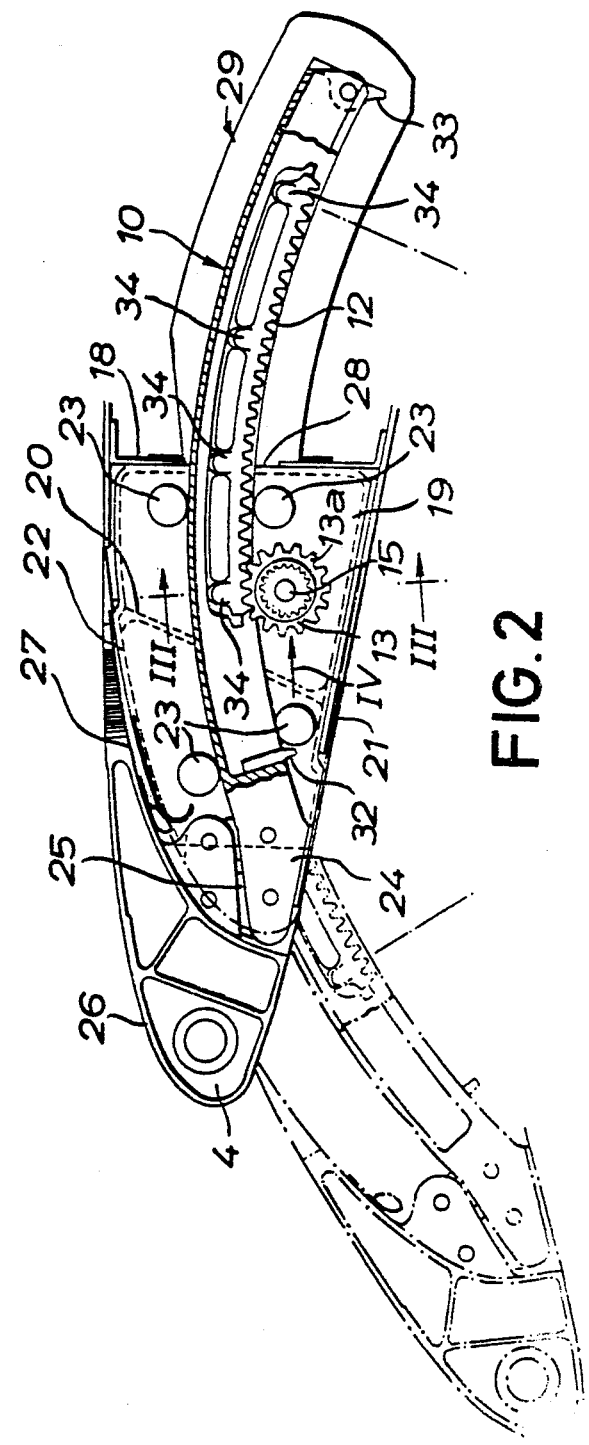
FIG. 2 illustrates a side elevation on a typical leading edge slat support and actuation arrangement in the direction of arrow II in FIG. 1.
Figure 3:
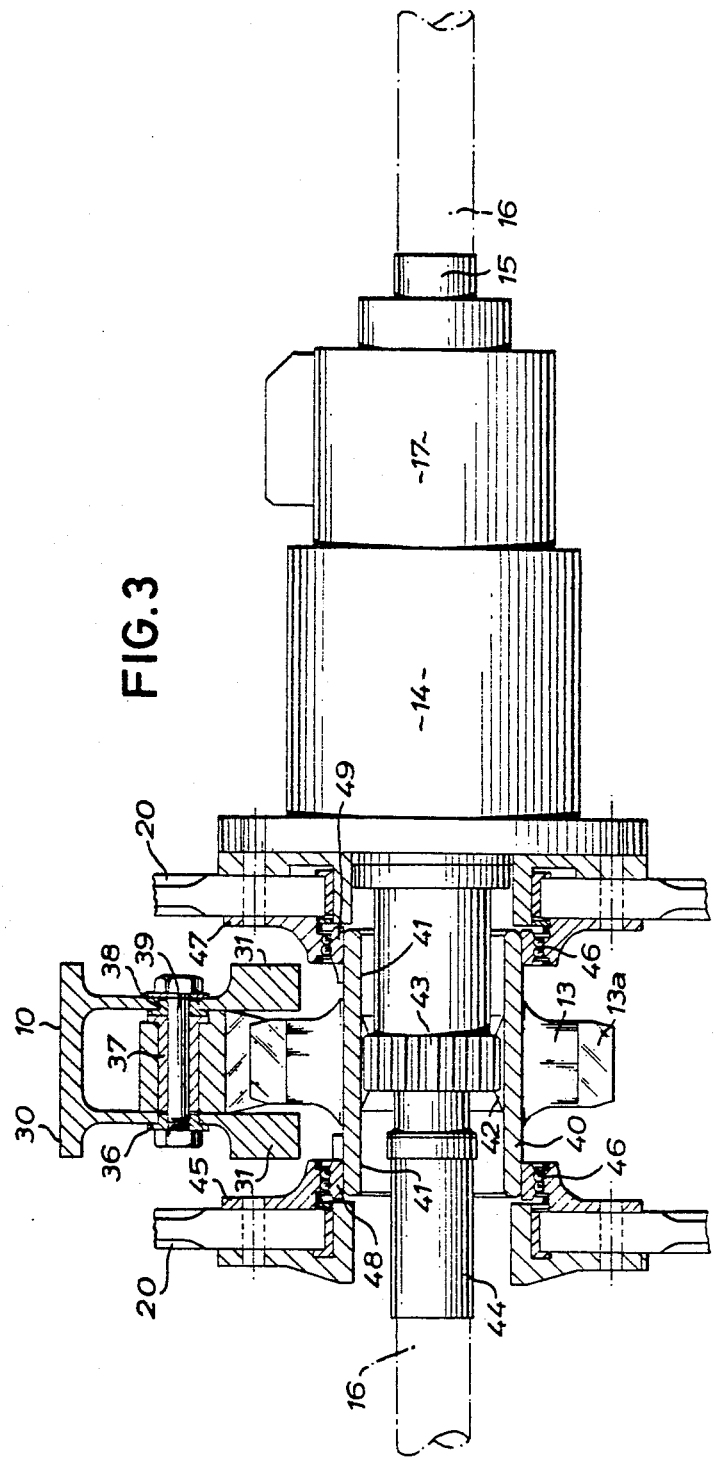
FIG. 3 illustrates in partial cross-section a view on a typical slat support and actuation arrangement taken along the plane indicated by a line III—III in FIG. 2.

The arrangement of FIG. 2 with FIG. 3 illustrates a typical leading edge slat support and actuation arrangement and, additionally, the associated fixed wing leading edge structure. The fixed wing leading edge structure 19 extends forwardly of the wing front spar 18 and includes a leading edge region 22 of generally convex form and a lower surface region 21 conforming to wing aerodynamic profile. Within the area bounded by the leading edge region and the front spar 18 is provided a pair of spaced apart ribs 20 to each of which is rotatably located a set of four spaced apart roller bearings 23. An arcuate slat support beam 10 is supported and guided by the roller bearings. The beam supports at its forward end 24 via an adjustable knuckle assembly 25 a spanwise extending slat 4, the slat 4 including a leading edge region 26 conforming to wing profile and a trailing edge region 27, this trailing edge region being configured generally to match a major portion of the leading edge region 22.

From FIG. 2 it will be seen that to accommodate a range of slat movement from its stowed cruise configuration to its extended high lift position (as indicated in chain-dot lines), the arcuate support beam 10 is of such length that, when stowed, it will protrude into the wing fuel tank area by way of an opening 28 in the front spar 18, necessitating a fuel-tight slat can 29 in which to accommodate the track 10.

The slat support beam 10 is machined from a single piece of material and over a greater portion of its length is a generally inverted channel section having upper and lower outwardly facing side flange extensions to provide upper (30) and lower (31) rolling surfaces for engaging roller bearings 23. End stops 32 and 33 are positioned within the track 10.

In FIG. 2 the arcuate track 10 is sectioned longitudinally to illustrate more clearly the arcuate gear rack 12 which is positioned within the track 10 in a downwardly facing direction and located to it at four attachment positions 34.

Positioning of the gear rack 12 in a vertical sense is critical since it must be accurately positioned to ensure that the gear teeth are set at the correct pitch circle radius (PCR) to achieve proper meshing with the pinion gear 13. Consequently it would be impracticable to predrill the attachment holes in both the beam 10 and the gear rack 12 with sufficient accuracy at the machining stage and achieve the desired PCR when the two component parts are brought together, by the simple insertion of bolts as suggested in the prior art U.S. Pat. No. 4,471,928.

In accordance with the present invention, the attachment holes 35 in the side walls of the track 10 and the corresponding holes in the gear rack 12 are formed oversize and respectively accommodate headed bushes 36 and 37 and 38, the gear rack 12 being locally rebated at each attachment position to accommodate the abutting heads of the bushes 37 and 38. The bushes employed are 'soft bushes' and incorporate pilot or undersized holes. With the bushes located in position and the jig of the gear rack 12 located with respect to the track 10 at the correct PCR, the correct sized attachment holes are drilled through the assembly and the attachment bolts 39 installed. By this means of assembly damaged or worn component parts may be readily replaced whilst maintaining accurate positioning.

Yet another benefit of the present invention over known prior art arrangements is illustrated more clearly by reference to FIG. 3 and resides in the ability to maintain the pinion gear 13 in correct meshing engagement with the installed gear rack 12 whilst enabling the actuator 14 to be disconnected and withdrawn for whatever purpose. The pinion gear 13, a one-piece machining, comprises a sprocket wheel 13a concentrically disposed about a shaft 40 equally disposed to each side of the sprocket wheel. The shaft 40 includes a concentric bore 41 extending partly therethrough from each end but terminating in an internally serrated spline portion 42 for slidably engaging the serrated shaft portion 43 on the drive shaft 44 of the actuator 14.

As previously described, the pinion gear 13, the actuator 14 and the torque shafts 16 are coaxially located about a common longitudinal axis of rotation 15. The pinion gear 13 is rotatably supported upon the fixed wing leading edge structure between the rib pairs 20 by means of bearing housing assemblies 45 and 47 mounted upon the inner faces of each respective rib 20. The assemblies 45, 47 incorporate self-aligning bearings 46, the inner bearing sleeves 48 and 49 being constrained to rotate in conjunction with the pinion gear 13 by the arrangement shown in FIGS. 4, 5 and 6. The inner bearing sleeve 49 incorporates a local lug 50 drilled in conjunction with the pinion gear shaft 40 to incorporate a special tubular rivet 51. The opposite inner bearing sleeve 48 incorporates a local lug 52 incorporating a transverse slot 53 for slidably engaging a parallel-sided pin 54 located in the pinion gear shaft 40 and protruding outwardly as shown. This ensures that the bearing sleeve 48 and the pinion gear 13 are constrained to rotate in unison but lateral constructional tolerances or in-flight deflections, for example, are accommodated by means of the pin 54 slidably moving along the slot 53. Because each local lug 50 and 52 is an extension of its respective bearing sleeve and the sleeves are hardened steel material, the lugs must be heat treated to achieve an acceptable level of malleability, thus obviating any possibility of lug fracture when the assembly is subject to flexure, for example. Furthermore, to accommodate possible differential sliding movement between the sprocket shaft 40 and the inner bearing sleeve 48, the sleeve inner surface 55 is treated with a suitable low friction coating.

I claim:

1. A mechanism for supporting and extending a high lift device relative to an aerofoil, comprising one or more carrier beams adapted to be connected to said aerofoil, a pair of spaced apart chordwise extending wing ribs bounding said carrier beam(s), supporting means mounted between said wing ribs for supporting said carrier beam(s), said carrier beam(s) carrying a gear rack with gear teeth facing downwardly and a pinion gear in meshing engagement with said gear rack, and an actuator in driving engagement with said pinion gear to extend and retract the high lift device relative to said aerofoil, the improvement comprising means for rotatably supporting said pinion gear between said wing ribs about a generally transverse axis of rotation independently of said actuator, and said means for rotatably supporting said pinion gear includes self-aligning bearings with inner bearing sleeves mounted fast in rotation with the pinion gear.

2. A mechanism according to claim 1, wherein the means for rotatably supporting said pinion gear includes a pair of bearing housing assemblies; and wherein one of said inner bearing sleeves is secured to said pinion gear by yieldable means providing at least one of: constructional tolerances and accommodation for in-flight deflections.

3. A mechanism according to claim 2, wherein said yieldable means includes securing means for slidably engaging a part of a shaft on which said pinion gear is mounted.

4. A mechanism according to claim 1, wherein the gear rack and the wing ribs are secured together by means of a plurality of oversize attachment holes provided therein in which holes are accommodated headed bushes of 'soft' material, and attachment bolts are passed through said holes and bushes.

5. A mechanism according to claim 1 wherein said pinion gear includes a sprocket wheel fixed to a shaft, said shaft having two ends, each end of said shaft having one of said inner bearing sleeves mounted thereto.

* * * * *